US012693680B2

(12) United States Patent
Jun et al.

(10) Patent No.: US 12,693,680 B2
(45) Date of Patent: Jul. 28, 2026

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Keonwook Jun, Suwon-si (KR); Kyoungchoon Park, Suwon-si (KR); Jinhyeong Ahn, Suwon-si (KR); Guwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 18/440,346

(22) Filed: Feb. 13, 2024

(65) Prior Publication Data

US 2024/0184308 A1      Jun. 6, 2024

Related U.S. Application Data

(63) Continuation of application No. PCT/KR2022/012225, filed on Aug. 17, 2022.

(30) Foreign Application Priority Data

Oct. 12, 2021      (KR) ........................ 10-2021-0135226

(51) Int. Cl.
*G05D 1/617*          (2024.01)
*G05D 1/246*          (2024.01)
(Continued)

(52) U.S. Cl.
CPC ............. *G05D 1/617* (2024.01); *G05D 1/246* (2024.01); *G05D 1/689* (2024.01);
(Continued)

(58) Field of Classification Search
CPC ........ G05D 1/617; G05D 1/246; G05D 1/689; G05D 2101/15; G05D 2105/55; G05D 2105/70; G05D 2107/40; G05D 2111/20
See application file for complete search history.

(56) References Cited

U.S. PATENT DOCUMENTS

| | | | |
|---|---|---|---|
| 7,447,564 B2 | 11/2008 | Yasukawa et al. | |
| 8,045,418 B2 * | 10/2011 | Suzuki ................. | G05D 1/0255 700/245 |

(Continued)

FOREIGN PATENT DOCUMENTS

| | | |
|---|---|---|
| JP | 4026758 B2 | 12/2007 |
| KR | 10-1832952 B1 | 2/2018 |

(Continued)

OTHER PUBLICATIONS

Amazon unveils Astro, Aaron Raj, Sep. 29, 2021, 12 pages, techhq. com (Year: 2021).*

(Continued)

*Primary Examiner* — Dale W Hilgendorf
(74) *Attorney, Agent, or Firm* — Sughrue Mion, PLLC

(57) ABSTRACT

A method for controlling an electronic apparatus, includes: identifying whether an emergency context is occurred by obtaining a sound near the electronic apparatus; based on identifying that the emergency context is occurred, obtaining information relating to a location where a sound relating to the emergency context is generated based on information relating to the obtained sound; based on the information relating to the location, determining a first area corresponding to the location where the sound relating to the emergency context is generated; controlling a driver to move to the determined first area; obtaining information relating to the emergency context from the first area; based on context information and user history information, determining a second area corresponding to the location of the user;

(Continued)

THERE IS A FIRE ON THE
FIRST FLOOR OF THE BUILDING!
PLEASE EVACUATE.

110-1  150  110-2

100

130 controlling the driver to move to the determined second area; and providing the information relating to the emergency context to the user in the second area.

15 Claims, 16 Drawing Sheets

(51) Int. Cl.

| | | |
|---|---|---|
| *G05D 1/689* | (2024.01) | |
| *G05D 101/15* | (2024.01) | |
| *G05D 105/55* | (2024.01) | |
| *G05D 105/70* | (2024.01) | |
| *G05D 107/40* | (2024.01) | |
| *G05D 111/20* | (2024.01) | |

(52) U.S. Cl.
CPC ..... *G05D 2101/15* (2024.01); *G05D 2105/55* (2024.01); *G05D 2105/70* (2024.01); *G05D 2107/40* (2024.01); *G05D 2111/20* (2024.01)

(56) References Cited

U.S. PATENT DOCUMENTS

| | | | | |
|---|---|---|---|---|
| 9,643,722 | B1 * | 5/2017 | Myslinski | G06Q 10/40 |
| 11,019,972 | B2 * | 6/2021 | Lee | B25J 9/1697 |
| 11,455,792 | B2 * | 9/2022 | Maeng | G05D 1/0246 |
| 11,790,932 | B2 * | 10/2023 | Tang | G06F 17/15 381/56 |
| 2018/0284773 | A1 * | 10/2018 | Pratt | G05D 1/0094 |
| 2019/0278294 | A1 * | 9/2019 | Shimada | G05D 1/0274 |
| 2020/0019779 | A1 * | 1/2020 | Maeng | G05D 1/0246 |
| 2020/0099545 | A1 * | 3/2020 | Hong | H04L 67/55 |
| 2020/0348697 | A1 * | 11/2020 | Kuhara | G05D 1/106 |
| 2020/0364026 | A1 * | 11/2020 | Lee | G10L 25/51 |
| 2021/0046650 | A1 * | 2/2021 | Deyle | G05D 1/0214 |
| 2021/0174534 | A1 * | 6/2021 | Yi | G10L 25/51 |
| 2021/0182386 | A1 | 6/2021 | Hwang et al. | |
| 2021/0383822 | A1 * | 12/2021 | Roberts | G01C 21/383 |
| 2022/0057815 | A1 * | 2/2022 | Raz | F41H 13/0081 |
| 2022/0355481 | A1 * | 11/2022 | Jo | A47L 9/2805 |
| 2023/0062175 | A1 * | 3/2023 | Yahata | G08B 25/04 |
| 2023/0147768 | A1 * | 5/2023 | Vaswani | G05D 1/0246 701/23 |
| 2025/0127362 | A1 * | 4/2025 | Ding | G05D 1/65 |

FOREIGN PATENT DOCUMENTS

| | | |
|---|---|---|
| KR | 10-2019-0027026 A | 3/2019 |
| KR | 10-2019-0100085 A | 8/2019 |
| KR | 10-2020-0034376 A | 3/2020 |
| KR | 10-2021-0004677 A | 1/2021 |
| KR | 10-2021-0030815 A | 3/2021 |
| KR | 10-2021-0070549 A | 6/2021 |
| KR | 10-2021-0074155 A | 6/2021 |
| KR | 10-2021-0076716 A | 6/2021 |
| KR | 10-2306437 B1 | 9/2021 |

OTHER PUBLICATIONS

International Search Report (PCT/ISA/210) issued by the International Searching Authority on Dec. 6, 2022 in corresponding International Application No. PCT/KR2022/012225.

Written Opinion (PCT/ISA/237) issued by the International Searching Authority on Dec. 6, 2022 in corresponding International Application No. PCT/KR2022/012225.

* cited by examiner

FIG. 10

| PROBABILITIES THAT THE USER MAY BE LOCATED FOR EACH AREA | |
|---|---|
| LIVING ROOM | 10% |
| ROOM 1 | 75% |
| ROOM 2 | 10% |
| ⋮ | |

520 — LIVING ROOM 540-1 — ROOM 1

540-2 — ROOM 2

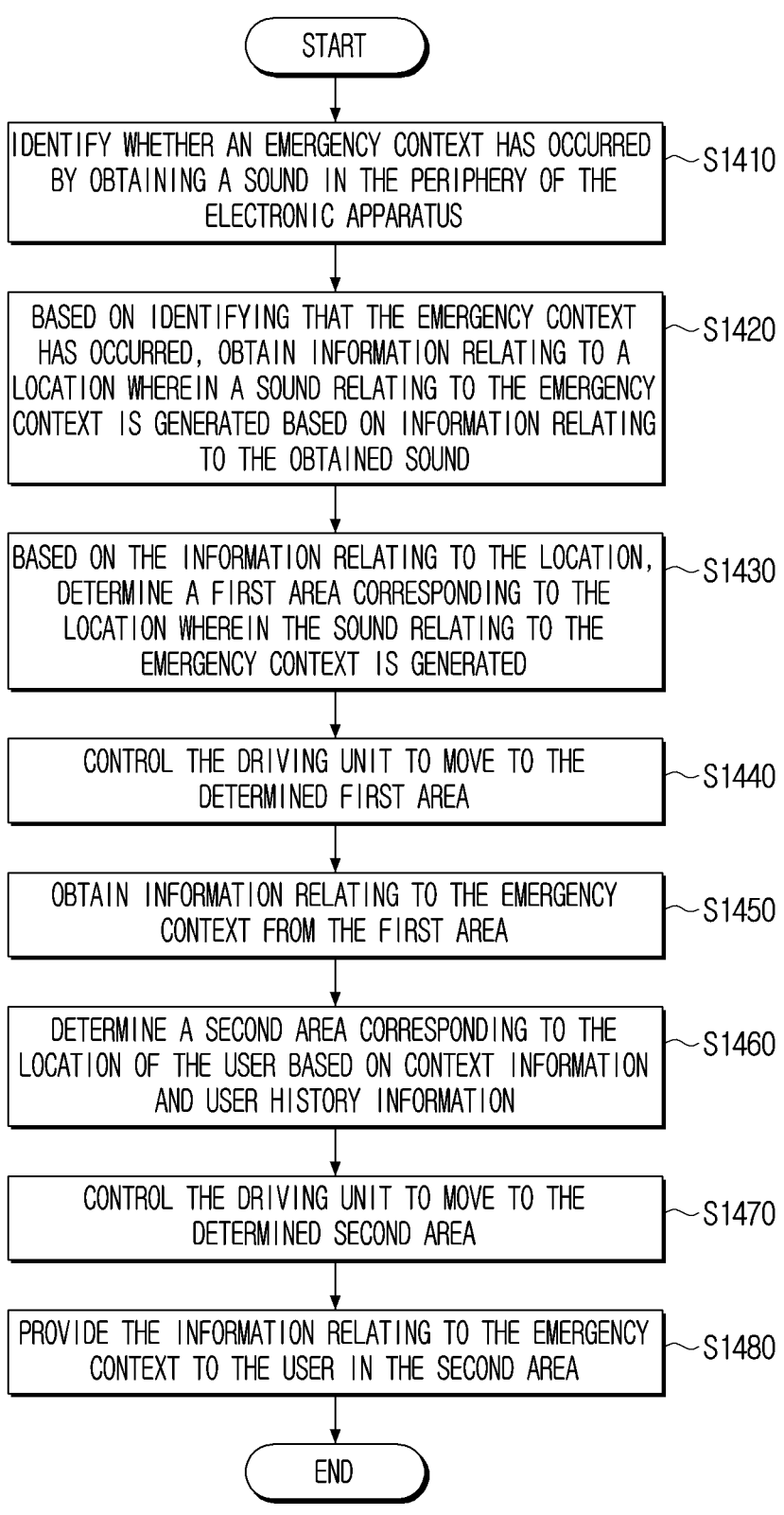

START

IDENTIFY WHETHER AN EMERGENCY CONTEXT HAS OCCURRED BY OBTAINING A SOUND IN THE PERIPHERY OF THE ELECTRONIC APPARATUS — S1410

BASED ON IDENTIFYING THAT THE EMERGENCY CONTEXT HAS OCCURRED, OBTAIN INFORMATION RELATING TO A LOCATION WHEREIN A SOUND RELATING TO THE EMERGENCY CONTEXT IS GENERATED BASED ON INFORMATION RELATING TO THE OBTAINED SOUND — S1420

BASED ON THE INFORMATION RELATING TO THE LOCATION, DETERMINE A FIRST AREA CORRESPONDING TO THE LOCATION WHEREIN THE SOUND RELATING TO THE EMERGENCY CONTEXT IS GENERATED — S1430

CONTROL THE DRIVING UNIT TO MOVE TO THE DETERMINED FIRST AREA — S1440

OBTAIN INFORMATION RELATING TO THE EMERGENCY CONTEXT FROM THE FIRST AREA — S1450

DETERMINE A SECOND AREA CORRESPONDING TO THE LOCATION OF THE USER BASED ON CONTEXT INFORMATION AND USER HISTORY INFORMATION — S1460

CONTROL THE DRIVING UNIT TO MOVE TO THE DETERMINED SECOND AREA — S1470

PROVIDE THE INFORMATION RELATING TO THE EMERGENCY CONTEXT TO THE USER IN THE SECOND AREA — S1480

END

1500

ELECTRONIC APPARATUS AND METHOD FOR CONTROLLING THEREOF

CROSS-REFERENCE TO RELATED APPLICATIONS

This application is a by-pass continuation application of International Application No. PCT/KR2022/012225, filed on Aug. 17, 2022, which is based on and claims priority to Korean Patent Application No. 10-2021-0135226, filed on Oct. 12, 2021, in the Korean Intellectual Property Office, the disclosures of which are incorporated by reference herein their entireties.

BACKGROUND

1. Field

The disclosure relates to an electronic apparatus and a method for controlling thereof, and more particularly, to an electronic apparatus that detects a sound relating to an emergency context and transmits information relating to the emergency context to a user, and a method for controlling thereof.

2. Description of Related Art

An electronic apparatus may perform various operations for assisting with a user's life. An electronic apparatus may obtain information by recognizing ambient sounds, store the obtained information in a storage medium or transmit the information to another external apparatus, and provide the information to a user by outputting the information to the outside. Here, the electronic apparatus may include a driver for moving to various locations, when necessary.

In case a user is immersed in another task, or a user's mobility is impaired, a problem may occur, which is that the user cannot recognize an emergency context that occurs outdoors or indoors well, and a measure for the emergency context is not performed swiftly.

Accordingly, an electronic apparatus that assists with a user's life needs to obtain information on an emergency context that the user could not recognize yet, and then transmit the information on the emergency context to the user swiftly, and thereby make the user to take an appropriate measure.

Here, a search for an implementation method of operations of moving to a location where a sound relating to an emergency context is generated for acquiring information on the emergency context correctly, and predicting an area where a user is to be located for transmitting the obtained information on the emergency context to the user, and moving to the user's location is requested.

SUMMARY

Provided are an electronic apparatus that provides information on an emergency context in or outside a home to a user who is immersed in another task inside the home or whose mobility is impaired, and thereby makes the user take an appropriate measure for the emergency context, and a method for controlling the electronic apparatus.

According to an aspect of the disclosure, an electronic apparatus includes: a microphone; a driver; an output; and at least one processor, wherein the at least one processor is configured to: identify whether an emergency context is occurred by obtaining a sound in a periphery of the electronic apparatus, based on identifying that the emergency context is occurred, obtain information relating to a location where a sound relating to the emergency context is generated based on information relating to the obtained sound, based on the information relating to the location, determine a first area corresponding to the location where the sound relating to the emergency context is generated, control the driver to move to the determined first area, obtain information relating to the emergency context from the first area, based on context information and user history information, determine a second area corresponding to the location of the user, control the driver to move to the determined second area, and provide the information relating to the emergency context to the user in the second area.

According to an aspect of the disclosure, a method for controlling an electronic apparatus, includes: identifying whether an emergency context is occurred by obtaining a sound in a periphery of the electronic apparatus; based on identifying that the emergency context is occurred, obtaining information relating to a location where a sound relating to the emergency context is generated based on information relating to the obtained sound; based on the information relating to the location, determining a first area corresponding to the location where the sound relating to the emergency context is generated; controlling a driver to move to the determined first area; obtaining information relating to the emergency context from the first area; based on context information and user history information, determining a second area corresponding to the location of the user; controlling the driver to move to the determined second area; and providing the information relating to the emergency context to the user in the second area.

As information on an emergency context in or outside a home is provided to a user who is immersed in another task inside the home or whose mobility is impaired, the user can recognize the fact that an emergency context occurred early and take an appropriate measure, and accordingly, damage to the human life or damage to the property can be prevented.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a diagram for illustrating probability values that a user may be located for each area obtained by an electronic apparatus based on context information and user history information according to an embodiment of the disclosure;

FIG. 14 is a flow chart for illustrating an operation of an electronic apparatus according to one or more embodiments of the disclosure.

DETAILED DESCRIPTION

Figure 1:
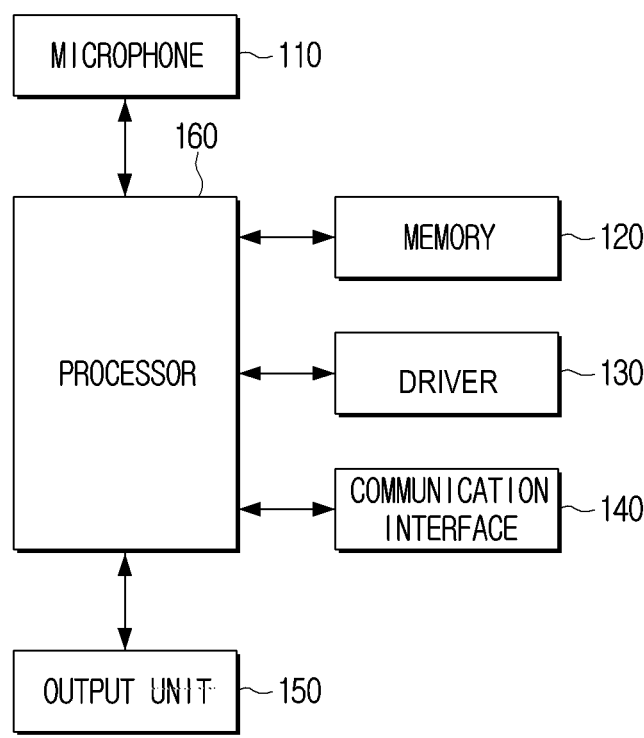
FIG. 1 is a block diagram illustrating a configuration of an electronic apparatus according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the one or more embodiments are not for limiting the scope of the disclosure to a specific embodiment, but they should be interpreted to include all modifications, equivalents, and/or alternatives of the embodiments of the disclosure. With respect to the detailed description of the drawings, similar components may be designated by similar reference numerals.

Also, in describing the disclosure, in case it is determined that detailed explanation of related known functions or components may unnecessarily confuse the gist of the disclosure, the detailed explanation will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, the terms used in the disclosure are just used to explain specific embodiments of the disclosure, and are not intended to limit the scope of the disclosure. Also, singular expressions include plural expressions, unless defined obviously differently in the context.

Also, in the disclosure, expressions such as "have," "may have," "include," and "may include" denote the existence of such characteristics (e.g., elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second," and the like used in the disclosure may describe various elements regardless of any order and/or degree of importance. Also, such expressions are used only to distinguish one element from another element, and are not intended to limit the elements.

The description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

In addition, in the embodiments of the disclosure, 'a module' or 'a unit' may perform at least one function or operation, and may be implemented as hardware or software, or as a combination of hardware and software. Also, a plurality of 'modules' or 'units' may be integrated into at least one module and implemented as at least one processor, excluding 'a module' or 'a unit' that needs to be implemented as specific hardware.

Various elements and areas in the drawings were illustrated schematically. Accordingly, the technical idea of the disclosure is not limited by the relative sizes or intervals illustrated in the accompanying drawings.

Hereinafter, the disclosure will be described in detail with reference to the accompanying drawings, such that those having ordinary skill in the art to which the disclosure belongs can easily carry out the embodiments according to the disclosure.

FIG. 1 is a block diagram illustrating a configuration of an electronic apparatus according to an embodiment of the disclosure.

An electronic apparatus 100 according to an embodiment of the disclosure may include a microphone 110, a memory 120, a driver 130, a communication interface 140, an output 150, and at least one processor 160. Throughout the disclosure, the processor 160 may refer to the at least one processor 160.

The electronic apparatus 100 is arranged in a specific space, and can provide various services to a user. Specifically, the electronic apparatus 100 may be a voice recognition robot, a route guidance robot, a serving robot, a cleaning robot, a medial robot, and an information providing robot, but is not limited thereto, and it may be an electronic apparatus that performs various functions for assisting with a user's life.

The microphone 110 may mean a module that obtains a sound and converts the sound into an electric signal, and it may be a condenser microphone, a ribbon microphone, a moving coil microphone, a piezoelectric microphone, a carbon microphone, and a micro electro mechanical system (MEMS) microphone. Also, the microphone 110 may be implemented in an omnidirectional type, a bidirectional type, a unidirectional type, a sub cardioid type, a super cardioid type, and a hyper cardioid type.

The microphone 110 may include a plurality of microphones 110-1, 110-2, and may be arranged on the surface of the electronic apparatus 100, or arranged to protrude from the surface, or arranged in the upper part or the side surface of the electronic apparatus 100. Also, the plurality of microphones 110-1, 110-2 may be arranged to be directed towards a plurality of different directions.

The processor 160 may detect a sound in real time through the microphone 110, and obtain information corresponding to the obtained sound.

Specifically, the processor 160 may obtain sound information by detecting a sound in the periphery of the electronic apparatus 100 and a sound relating to an emergency context through the microphone 110. The sound information obtained through the microphone 110 may include information relating to an emergency context.

The memory 120 stores various types of programs or data temporarily or non-temporarily, and transmits the stored information to the processor 160 according to a call of the processor 160. Also, the memory 120 may store various types of information necessary for operation, processing, or control operations, etc. of the processor 160 in electronic formats.

The memory 120 may include, for example, at least one of a main memory device or an auxiliary memory device. The main memory device may be implemented by using a semiconductor storage medium such as a ROM and/or a RAM. A ROM may include, for example, a ROM, an EPROM, an EEPROM, and/or a MASK-ROM, etc. which are general. A RAM may include, for example, a DRAM and/or an SRAM, etc. The auxiliary memory device may be implemented by using at least one storage medium that can store data permanently or semi-permanently like an optical medium such as a flash memory device, a secure digital (SD) card, a solid state drive (SSD), a hard disc drive (HDD), a magnetic drum, a compact disc, a DVD, or a laser disc, etc., a magnetic tape, a magneto-optical disc, and/or a floppy disc, etc.

The memory 120 according to one or more embodiments of the disclosure may store a first neural network model (e.g., a model determining a location where an emergency context occurred), a second neural network model (e.g., a model determining a user's location), context information, user history information, a map for a space, a name of a space, a moving path inside a space, information relating to an ambient sound, information relating to a sound relating to an emergency context, information relating to an emergency context, etc., and transmit the stored information to the processor 160 according to a call of the processor 160.

The driver 130 may mean a module that makes the electronic apparatus 100 move to various locations. The driver 130 may include or correspond to a gasoline engine, a diesel engine, a liquefied petroleum gas (LPG) engine, an electric motor, etc. according to a power generation source (e.g., fossil fuel, electricity) generating power for the electronic apparatus 100 to move. Also, the driver 130 may include a steering device for adjusting a moving direction (e.g., a manual steering, a hydraulics steering, an electronic control power steering (EPS), etc.).

The driver 130 may include a unit that moves the electronic apparatus 100 (e.g., a wheel, a propeller, etc.). Here, the driver 130 may be implemented while being modified according to a driving type (e.g., a wheel type, a walking type, a flight type, etc.) of the electronic apparatus 100.

The communication interface 140 may include a wireless communication interface, a wired communication interface, or an input interface. A wireless communication interface may perform communication with various kinds of external apparatuses by using a wireless communication technology or a mobile communication technology. As such a wireless communication technology, for example, Bluetooth®, Bluetooth Low Energy, CAN communication, Wi-Fi, Wi-Fi Direct®, ultrawide band (UWB) communication, Zigbee®, infrared Data Association (IrDA), or near field communication (NFC), etc. may be included, and as a mobile communication technology, 3GPP, Wi-Max, Long Term Evolution (LTE), 5G, etc. may be included. A wireless communication interface may be implemented by using an antenna, a communication chip, and a substrate, etc. that can transmit an electromagnetic wave to the outside or receive an electromagnetic wave transmitted from the outside.

A wired communication interface may perform communication with various kinds of external apparatuses based on a wired communication network. Here, a wired communication network may be implemented, for example, by using a physical cable such as a pair cable, a coaxial cable, an optical fiber cable, or an Ethernet cable, etc.

Any one of a wireless communication interface or a wired communication interface may be omitted depending on embodiments. Accordingly, the electronic apparatus 100 may include only a wireless communication interface or include only a wired communication interface. Not only that, the electronic apparatus 100 may include an integrated communication interface that supports both wireless connection by a wireless communication interface and wired connection by a wired communication interface.

The electronic apparatus 100 is not limited to a case of including one communication interface 140 performing communicative connection by one method, but may include a plurality of communication interfaces 140.

The processor 160 according to one or more embodiments of the disclosure may perform communication with various external electronic apparatuses or a server existing outdoors or indoors through the communication interface 140.

Specifically, the processor 160 may perform communicative connection with a TV, an air conditioner, a washing machine, a refrigerator, a dryer, a microwave oven, a gas range, an inductor, a boiler, a coffee pot, a dryer, a lamp, a projector, a speaker, a computer, a laptop, a tablet, a smartphone, a wire telephone, etc. through the communication interface 140 and transmit information relating to an emergency context, information relating to a moving path of the electronic apparatus 100, or a signal for controlling an external electronic apparatus, or receive news information, information relating to an emergency context, various signals relating to operations of an external apparatus, etc. from the external apparatus.

Also, the processor 160 may perform communicative connection with a server through the communication interface 140 and transmit information relating to a moving path of the electronic apparatus 100 or probabilities that a user may be located for each area, and receive voice information relating to an emergency context or a user manual relating to an emergency context.

The output 150 may include a speaker 150-1, a display 150-2, a vibration generator 150-3, etc., but is not limited thereto, and it may include one or more embodiments of transmitting information in a form that can be detected by a user's five senses.

The speaker 150-1 may include a tweeter for reproducing a sound of a high vocal range, a mid-range for reproducing a sound of a middle vocal range, a woofer for reproducing a sound of a low vocal range, a sub-woofer for reproducing a sound of an extreme low vocal range, an enclosure for controlling resonance, a crossover network dividing electric signal frequencies input into the speaker by each band, etc.

The speaker 150-1 may output an acoustic signal to the outside of the electronic apparatus 100. Also, the speaker 150-1 may reproduce multimedia and recording, and output various kinds of notification sounds and voice messages, etc. The electronic apparatus 100 may include an audio output device such as the speaker 150-1, but may also include an output device such as an audio output terminal. In particular, the speaker 150-1 may provide obtained information, information processed or produced according to the obtained information, and a response result or an operation result, etc. regarding a user voice in voice forms.

Specifically, according to the one or more embodiments of the disclosure, the processor 160 may provide information relating to an emergency context, information relating to a user action manual according to an emergency context, and information relating to an evacuation route in voice forms through the speaker 150-1, or output notification sounds, warning sounds, etc. of which sound ranges vary according to the type and the degree of danger of an emergency context identified by the processor 160.

The display 150-2 may include various types of display panels such as a liquid crystal display (LCD) panel, an organic light-emitting diodes (OLED) panel, active-matrix organic light-emitting diodes (AM-OLED), Liquid Crystal on Silicon (LcoS), quantum dot light-emitting diodes (QLED) and digital light processing (DLP), a plasma display panel (PDP), an inorganic LED panel, a micro LED panel, etc. but is not limited thereto.

The display 150-2 may include a touch screen together with a touch panel, or may include a flexible panel.

According to the one or more embodiments of the disclosure, the processor 160 may output information relating to an emergency context, information relating to a user action manual according to an emergency context, and information relating to an evacuation route in a form of visual information through the display 150-2. Also, the processor 160 may output visual information including colors such as red, orange, yellow, green, blue, etc. according to the type and the degree of danger of an emergency context identified by the processor 160.

The vibration generator 150-3 may convert an electric signal into a mechanical stimulus (e.g., a vibration or a movement) or an electric stimulus that a user can recognize through a tactile or kinetic sense. According to an embodiment, the vibration generator 150-3 may include, for example, a motor, a piezoelectric element, or an electric stimulation device.

According to the one or more embodiments of the disclosure, the processor 160 may output a vibration by varying the strength of the vibration through the vibration generator 150-3 according to the degree of danger of an emergency context. Specifically, if an emergency context is identified as an emergency context of a higher degree of danger, the processor 160 may output a strong vibration, and if an emergency context is identified as an emergency context of a relatively low degree of danger, the processor 160 may output a weak vibration.

The processor 160 controls the overall operations of the electronic apparatus 100. Specifically, the processor 160 is connected with the components of the electronic apparatus 100 including the memory 120 as described above, and may control the overall operations of the electronic apparatus 100 by executing at least one instruction stored in the memory 120 as described above. In particular, the processor 160 may not only be implemented as one processor 160, but also be implemented as a plurality of processors 160.

The processor 160 may be implemented in various ways. For example, the processor 160 may be implemented as at least one of an application specific integrated circuit (ASIC), an embedded processor, a microprocessor, a hardware control logic, a hardware finite state machine (FSM), or a digital signal processor (DSP).

In the disclosure, the processor 160 may include one or more of a central processing unit (CPU) processing digital signals, a micro controller unit (MCU), a micro processing unit (MPU), a controller, an application processor (AP), or a communication processor (CP), and an ARM processor, or may be defined by the terms. Also, the processor 160 may be implemented as a System on Chip (SoC) having a processing algorithm stored therein or large scale integration (LSI), or in the form of a field programmable gate array (FPGA). The processor 160 may perform various functions by executing computer executable instructions stored in the memory 120. In addition, the processor 160 may include at least one of a graphics-processing unit (GPU), a neural processing unit (NPU), or a visual processing unit (VPU) which are separate AI-dedicated processors for performing an artificial intelligence function.

The processor 160 according to the one or more embodiments of the disclosure may identify whether an emergency context has occurred by obtaining a sound in the periphery of the electronic apparatus 100. If it is identified that an emergency context has occurred, the processor 160 may input information relating to the obtained sound into a first neural network model (e.g., a model determining a location where an emergency context occurred) and obtain information relating to a location where a sound relating to the emergency context is generated, and based on the information relating to the location where the sound relating to the emergency context is generated, control the driver 130 to move to a first area corresponding to the location where the sound relating to the emergency context is generated. In the first area, the processor 160 may obtain information relating to the emergency context, and control the driver 130 to move to a second area corresponding to the location of the user

9

10 based on context information and user history information, and control the electronic apparatus 100 to provide the information relating to the emergency context to the user in the second area.

A detailed method for the electronic apparatus 100 by the processor 160 will be described with reference to FIG. 2 to FIG. 13.

Figure 2A:
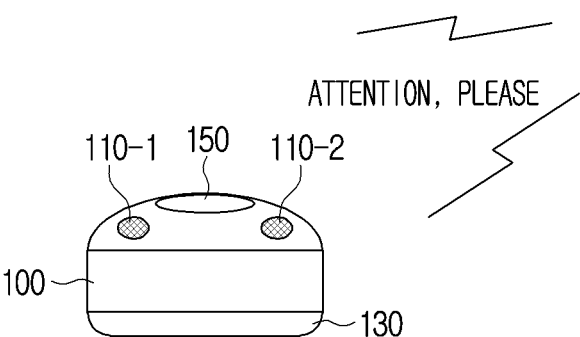
FIG. 2A is a diagram for illustrating an operation of an electronic apparatus of identifying whether an emergency context has occurred by obtaining an ambient sound according to an embodiment of the disclosure.
Figure 2B:
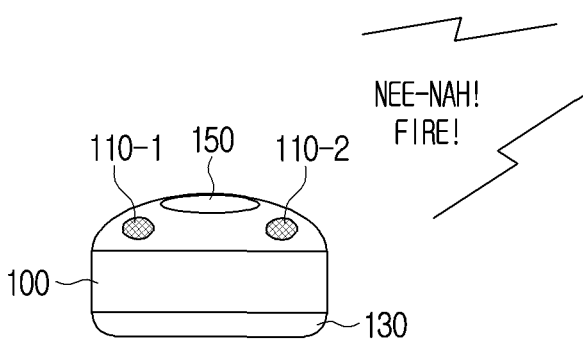
FIG. 2B is a diagram for illustrating an operation of an electronic apparatus of identifying whether an emergency context has occurred by obtaining an ambient sound according to another embodiment of the disclosure.

FIG. 2A and FIG. 2B are diagrams for illustrating an operation of an electronic apparatus of identifying whether an emergency context has occurred by obtaining an ambient sound according to one or more embodiments of the disclosure.

Referring to FIG. 2A and FIG. 2B, the processor 160 of the electronic apparatus 100 may obtain information included in an ambient sound by detecting a sound in the periphery of the electronic apparatus through the microphone 110. As an ambient sound, there are a TV sound, a washing machine sound, a dryer sound, a refrigerator sound, a conversation sound of people, a music sound, etc. and it may be a sound relating to an emergency context.

The processor 160 may train a neural network model (e.g., a model determining an emergency context) by inputting a sound in the periphery of the electronic apparatus, and determine whether an emergency context has occurred.

Specifically, a sound relating to an emergency context may include at least one of a person's screaming sound (e.g., It's a fire!, It's a thief!, It's a war!, It's an earthquake!, We're in trouble!, etc.), a siren sound (e.g., nee-nah, etc.), a starting sound of indoor broadcasting (e.g., Attention please, ding dong, etc.), a sound asking for help (e.g., Save me!, Help me!, Is anybody here?, etc.), a sound of a front door or a window breaking down, or a sound of explosion.

The processor 160 may detect an ambient sound through the microphone 110 and obtain information relating to the sound. The processor 160 may identify whether the ambient sound coincides with the information relating to sounds relating to an emergency context based on a database relating to sound information relating to an emergency context stored in the memory 120 or an external server. If the obtained ambient sound and the information relating to sounds relating to an emergency context coincides, the processor 160 may identify that an emergency context has occurred.

If it is identified that an emergency context has occurred based on the obtained sound information, the processor 160 may convert from a normal mode to an emergency context mode. The processor 160 may obtain a probability relating to the location where the sound relating to the emergency context was generated by inputting the sound relating to the emergency context into the first neural network model in the emergency context mode.

Figure 3:
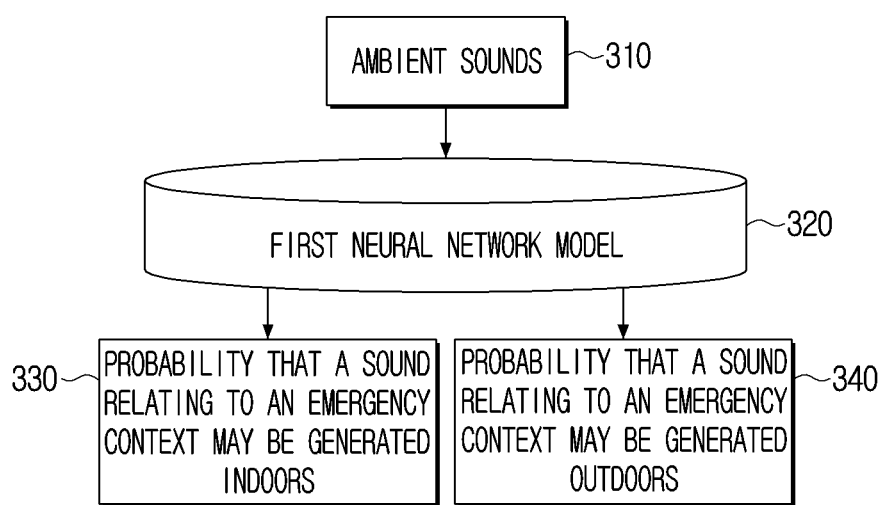
FIG. 3 is a flow chart for illustrating an input value and an output value of a first neural network model according to one or more embodiments of the disclosure.

FIG. 3 is a flow chart for illustrating an input value and an output value of a first neural network model according to one or more embodiments of the disclosure.

A neural network model may include a learning algorithm. For example, a neural network model may include supervised learning, unsupervised learning, semi-supervised learning, or reinforcement learning, but is not limited to the aforementioned examples. An artificial intelligence model may include a plurality of artificial neural network layers.

The processor 160 may input sound information obtained by detecting an ambient sound 310 into the first neural network model 320.

When the ambient sound 310 is input into the first neural network model 320, the first neural network model 320 may output information relating to a location where a sound relating to an emergency context was generated as an output value.

For example, the processor 160 may obtain a first probability 330 that the location is indoors from the output value of the first neural network model and a second probability 340 that the location where the sound relating to the emergency context was generated is outdoors, and based on the loudest value among the plurality of probabilities, obtain information relating to the location where the sound relating to the emergency context was generated.

However, embodiments of the disclosure are not limited thereto, and the processor 160 may obtain probabilities that a sound relating to an emergency context may be generated for each of the plurality of areas based on the output value of the first neural network model.

An artificial intelligence model may be constructed in consideration of the application field of a recognition model, the purpose of learning, or the computer performance of an apparatus, etc. Also, the artificial intelligence model may be, for example, a model based on a neural network. An artificial intelligence model may be designed to simulate a human brain structure on a computer. Also, an artificial intelligence model may include a plurality of network nodes having weights, which simulate neurons of a human neural network. Each of the plurality of network nodes may form a connective relation so as to simulate synaptic activities of neurons wherein neurons transmit and receive signals through synapses. Further, an artificial intelligence model may include, for example, a neural network model, or a deep learning model developed from a neural network model. In a deep learning model, a plurality of network nodes may be located in different depths (or, layers) from one another, and transmit and receive data according to a convolution connective relation. For example, models such as a deep neural network (DNN), a recurrent neural network (RNN), and bidirectional recurrent deep neural network (BRDNN) may be used as an artificial intelligence model, but embodiments of the disclosure are not limited thereto.

Specifically, a neural network model may include a plurality of artificial neural network layers. An artificial neural network may include a deep neural network (DNN), a convolutional neural network (CNN), a recurrent neural network (RNN), a restricted Boltzmann machine (RBM), a deep belief network (DBN), a bidirectional recurrent deep neural network (BRDNN), and deep Q-networks, or a combination of two or more of the above, but is not limited to the aforementioned examples. An artificial intelligence model may include a software structure additionally or alternatively, other than a hardware structure.

An output value relating to a location where a sound relating to an emergency context was generated is not limited thereto, and information meaning that a sound was generated inside a wall space of a building may be output.

Figure 4:
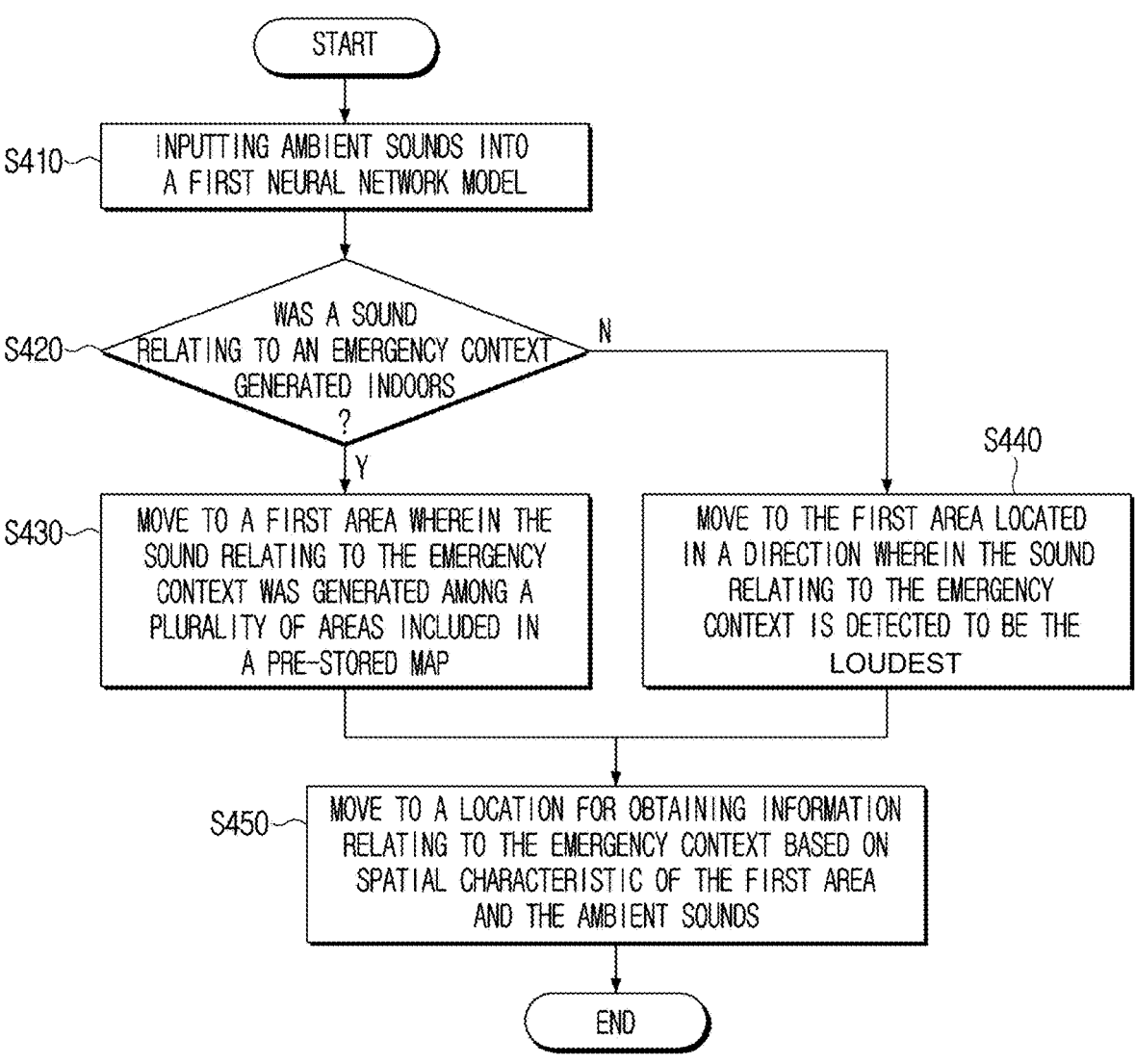
FIG. 4 is a flow chart for illustrating moving of an electronic apparatus to a first area according to an output value of a first neural network model according to one or more embodiments of the disclosure.

FIG. 4 is a flow chart for illustrating moving of an electronic apparatus to a first area according to an output value of a first neural network model according to one or more embodiments of the disclosure.

If the ambient sound 310 is input into the first neural network model 320 in operation S410, it may be identified whether a sound relating to an emergency context was generated indoors according to an output result of the first neural network model 320 in operation S420.

If the sound relating to the emergency context was generated indoors in operation S420-Y, the processor 160 may move to a first area where the sound relating to the emergency context was generated among a plurality of areas included in a map stored in advance in the memory 120 or the external server in operation S430. The first area may include a living room, a kitchen, a room, a toilet, a front door, a balcony, etc. Specifically, if the sound relating to the emergency context was identified as a starting sound of indoor broadcasting, the processor 160 may control the driver 130 such that the electronic apparatus 100 moves to an area where a broadcasting speaker is located.

If the sound relating to the emergency context was not generated indoors in operation S420-N, the processor 160 may move to the first area located in a direction where the volume of the sound relating to the emergency context is detected to be the loudest in operation S440. Here, the processor 160 may move to the first area located in a direction where the sound relating to the emergency context is detected to be the clearest compared to the ambient noises. For example, if it is identified that the sound relating to the emergency context is generated in the outside direction of the balcony of the living room, the processor 160 may control the driver 130 such that the electronic apparatus 100 moves to the balcony of the living room.

The processor 160 may move to a location for obtaining information relating to the emergency context based on a spatial characteristic of the first area and ambient sounds in operation S450. Specifically, the processor 160 may control the driver 130 such that the electronic apparatus 100 moves in a direction where there is no obstacle and a sound can be detected well as it is opened in the first area. In case the first area is the balcony, the processor 160 may control the driver 130 such that the electronic apparatus 100 moves to a location near the direction where the window is opened in the balcony. Also, the processor 160 may control the driver 130 such that the electronic apparatus 100 moves in a location corresponding to a direction of getting far from a noise source generating noises irrelevant to the sound relating to the emergency context.

Figure 5:
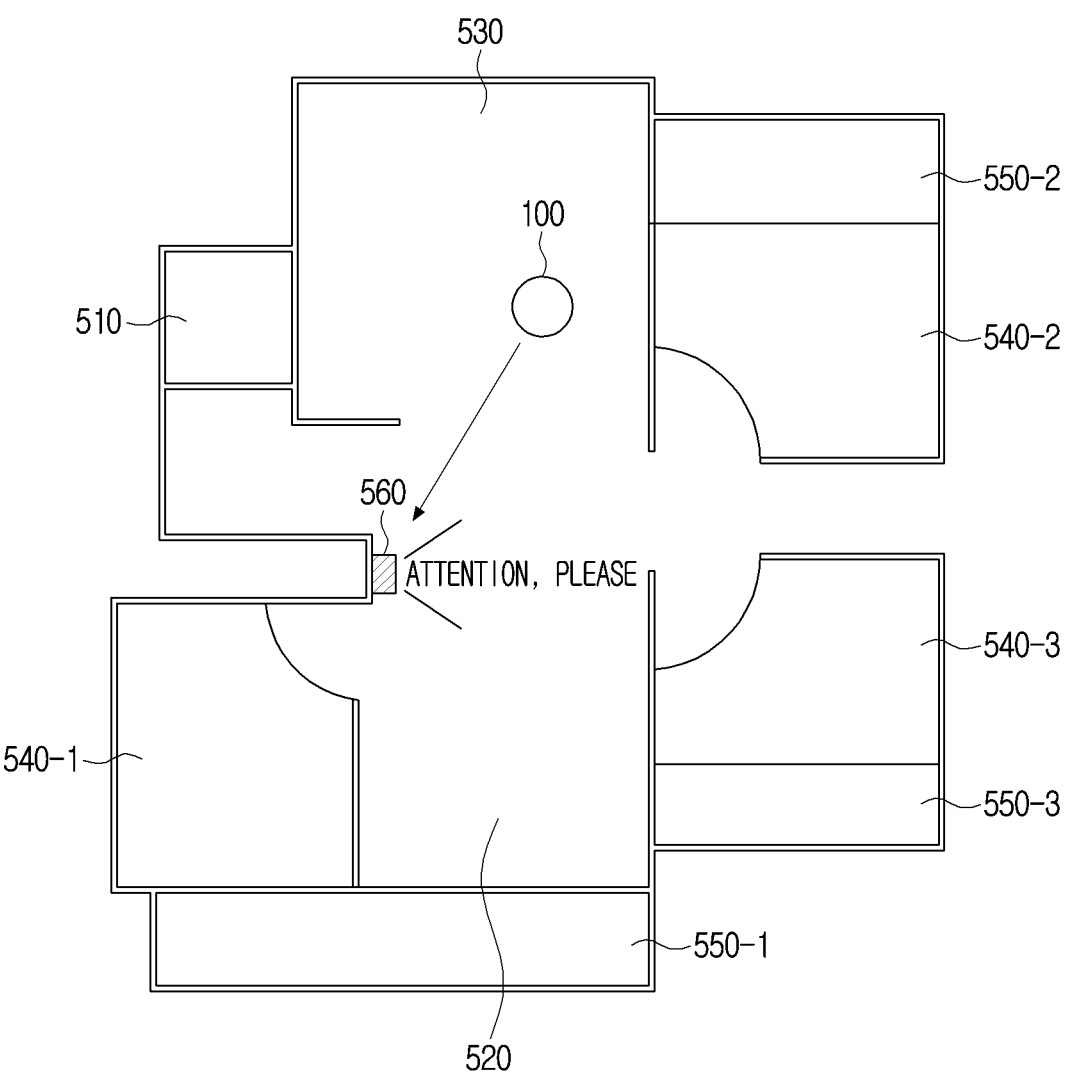
FIG. 5 is a diagram for illustrating an operation of an electronic apparatus of moving to a first area in case a sound relating to an emergency context was generated indoors according to an embodiment of the disclosure.

FIG. 5 is a diagram for illustrating an operation of an electronic apparatus of moving to a first area in case a sound relating to an emergency context was generated indoors according to an embodiment of the disclosure.

Referring to FIG. 5, if a sound relating to an emergency context is identified as a starting sound of indoor broadcasting generated indoors, the processor 160 may control the driver 130 to move to the area 560 wherein the broadcasting speaker is located which is the first area where the starting sound of indoor broadcasting was generated among the plurality of areas included in the map 500 stored in the memory 120 or the external server.

The map 500 stored in the memory 120 or the external server may include a plurality of areas including a front door 510, a living room 520, a kitchen 530, rooms 540-1, 540-2, 540-3, balconies 550-1, 550-2, 550-3, etc. However, embodiments of the disclosure are not limited to the aforementioned examples, and the map 500 may further include a utility room, an attic, a toilet, a laundry room, etc. Also, the arrangement and the shape of each area are not limited to the shapes in the map 500 illustrated in FIG. 5, but they may include various area arrangements and shapes.

Figure 6:
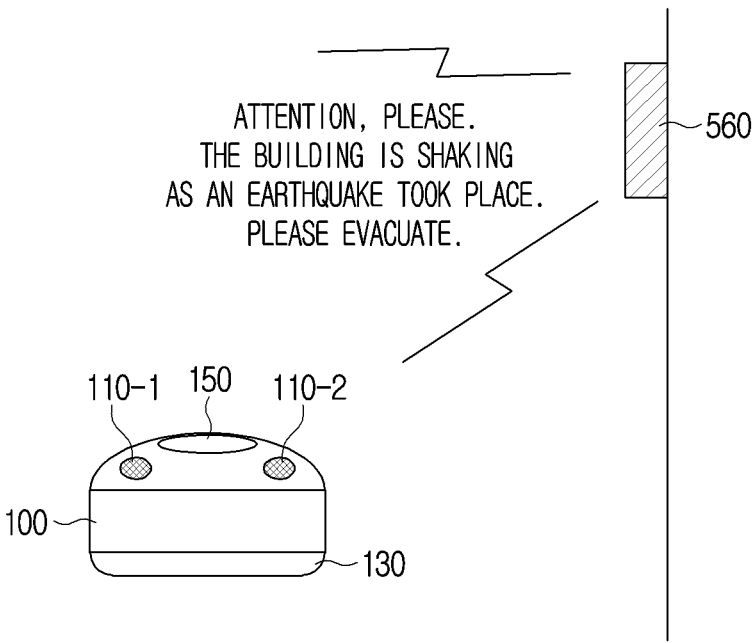
FIG. 6 is a diagram for illustrating an operation of an electronic apparatus of obtaining information on an emergency context in a first area according to an embodiment of the disclosure.

FIG. 6 is a diagram for illustrating an operation of an electronic apparatus of obtaining information on an emergency context in a first area according to an embodiment of the disclosure.

After the electronic apparatus 100 moved to the area 560 wherein the broadcasting speaker is located which is the first area, the electronic apparatus 100 may move to a direction where the volume of the sound of the indoor broadcasting relating to an emergency context is detected to be the loudest, and control the direction of the microphone 110 correspondingly to the direction where the volume of the sound relating to the emergency context is detected to be the loudest. Here, the electronic apparatus 100 may move to the direction where the sound relating to the emergency context is detected to be the clearest compared to the ambient noises, and control the direction of the microphone 110 correspondingly to the direction where the sound relating to the emergency context is detected to be the clearest compared to the ambient noises. For example, if the sound of the indoor broadcasting is detected on the upper side, the electronic apparatus 100 may control the microphone 110 such that the direction of the microphone 110 is directed toward the upper side.

Here, the processor 160 may rotate or tilt the electronic apparatus 100 to control the direction of the microphone 110. The processor 160 may make the microphone 110 protrude from the body of the electronic apparatus 100 so that the microphone 110 can detect a sound relating to an emergency context better.

Referring to FIG. 6, the processor 160 may obtain a sound of indoor broadcasting through the microphone 110, and obtain information relating to the content of the sound of the indoor broadcasting that was converted into a text form through the voice recognition module. Specifically, the processor 160 may obtain a sound of indoor broadcasting which is "Attention, please. The building is shaking as an earthquake took place. Please evacuate." through the microphone 110, and obtain information relating to the emergency context including a content which is "an earthquake took place," "the building is shaking," and "emergency evacuation" through a speech to text (STT) module.

The processor 160 may identify the content of the emergency context corresponding to the content of indoor broadcasting based on the database stored in the memory 120 or the external server, and obtain information relating to the emergency context. Also, the processor 160 may receive information relating to a user manual corresponding to the emergency context stored in the memory 120 or the external server through the communication interface 140.

Figure 7:
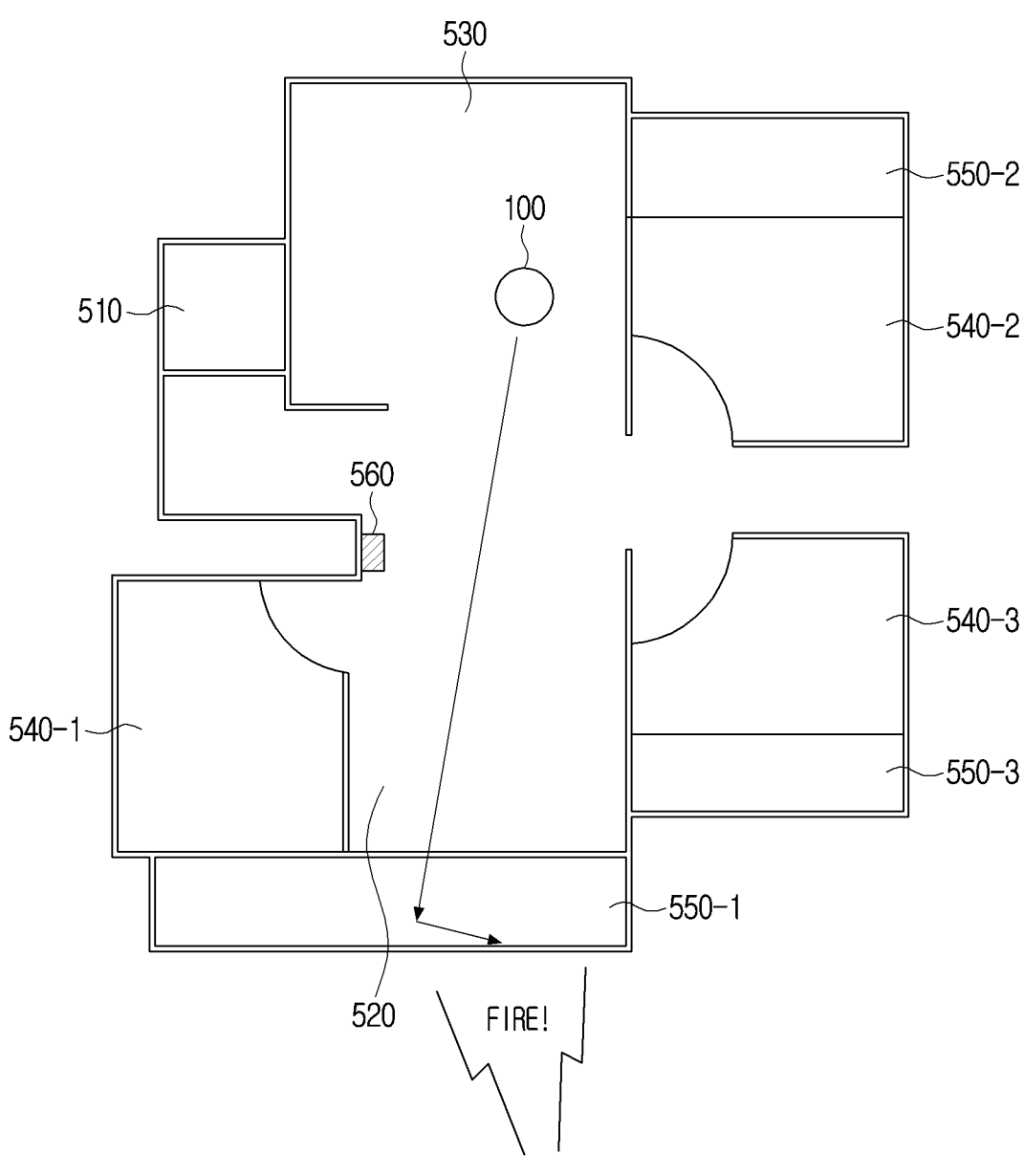
FIG. 7 is a diagram for illustrating an operation of an electronic apparatus of moving to a first area in case a sound relating to an emergency context was generated outdoors according to another embodiment of the disclosure.

FIG. 7 is a diagram for illustrating an operation of an electronic apparatus of moving to a first area in case a sound relating to an emergency context was generated outdoors according to another embodiment of the disclosure.

If it is identified that a sound relating to an emergency context is a screaming sound that occurred outdoors, the processor 160 may control the driver 130 to move to a first area located in a direction where the volume of the sound relating to the emergency context is detected to be the loudest among the plurality of areas included in the map 500 stored in the memory 120 or the external server or in a direction where the volume of the sound relating to the emergency context is detected to be the loudest compared to ambient noises, and control the driver 130 to be located in a direction for acquiring information relating to the emergency context in the first area based on the spatial characteristic of the first area and the ambient sounds.

Referring to FIG. 7, the processor 160 may control the driver 130 to move to the balcony 550-1 located in the direction where the volume of the sound relating to the emergency context which is "Fire!" is detected to be the loudest among the plurality of areas including the front door 510, the living room 520, the kitchen 530, the rooms 540-1, 540-2, 540-3, the balconies 550-1, 550-2, 550-3, etc., and control the driver 130 to move to the direction of the opened window wherein the volume of the sound relating to the emergency context which is "Fire!" is detected to be the loudest in the balcony.

Figure 8:
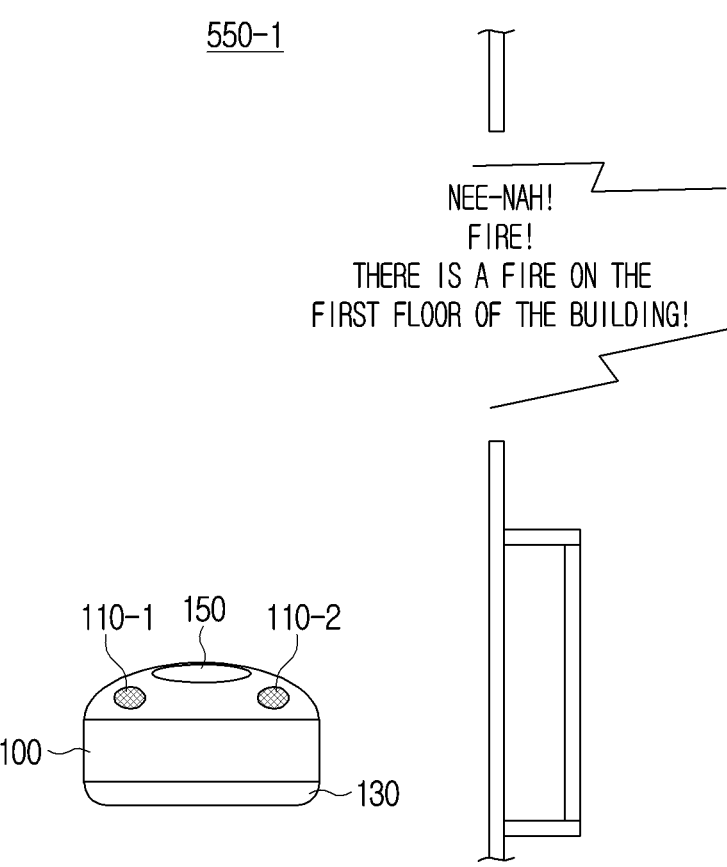
FIG. 8 is a diagram for illustrating an operation of an electronic apparatus of obtaining information relating to an emergency context in a first area according to another embodiment of the disclosure.

FIG. 8 is a diagram for illustrating an operation of an electronic apparatus of obtaining information relating to an emergency context in a first area according to another embodiment of the disclosure.

After the electronic apparatus 100 moves to the balcony 550-1 which is the first area, the electronic apparatus 100 may move to a direction where the volume of a screaming sound relating to an emergency context is detected to be the loudest, and control the direction of the microphone 110 correspondingly to the direction where the volume of the sound relating to the emergency context is detected to be the loudest. Here, the electronic apparatus 100 may move to the direction where the sound relating to the emergency context is detected to be the clearest compared to the ambient noises, and control the direction of the microphone 110 correspondingly to the direction where the sound relating to the emergency context is detected to be the clearest compared to the ambient noises. For example, the electronic apparatus 100 may control the microphone 110 such that the microphone 110 is directed toward the direction where the window wherein the screaming sound is detected is opened.

Here, the processor 160 may rotate or tilt the electronic apparatus 100 to control the direction of the microphone 110. The processor 160 may make the microphone 110 protrude from the body of the electronic apparatus 100 so that the microphone 110 can detect a sound relating to an emergency context better.

Referring to FIG. 8, the processor 160 may obtain a screaming sound through the microphone 110, and obtain information relating to the content of the screaming sound that was converted into a text form through the voice recognition module. Specifically, the processor 160 may obtain a screaming sound which is "Nee-nah! Fire! There's a fire on the first floor of the building!" through the microphone 110, and obtain information relating to the emergency context including a content which is "a fire took place on the first floor of the building" and "the fire engine is on the way" through the speech to text (STT) module.

Figure 9:
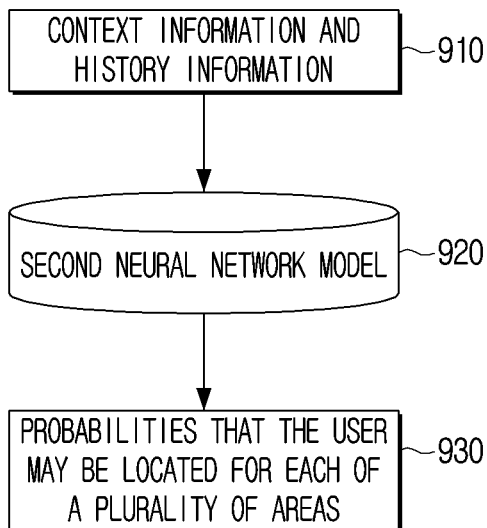
FIG. 9 is a flow chart for illustrating an input value and an output value of a second neural network model according to one or more embodiments of the disclosure.

FIG. 9 is a flow chart for illustrating an input value and an output value of a second neural network model according to one or more embodiments of the disclosure.

The processor 160 may detect a sound relating to an emergency context and obtain information relating to the emergency context, and then identify the location of the user for providing the obtained information relating to the emergency context to the user and generate a moving path, and control the driver 130 to move to a second area where the user is located.

Here, for identifying the location of the user, the processor 160 may input context information and user history information 910 into the second neural network model (e.g., a model determining a user's location) 920, and obtain information 930 on a plurality of areas wherein the user may be located, and information on probabilities that the user may be located in each area.

The context information may include information relating to the current date, the current time, the current season, the name of the space, whether an external electronic apparatus is operating, etc.

The user history information may be based on the history that the user used the voice recognition function of the electronic apparatus 100, or may be information relating to the history that the electronic apparatus 100 performed tasks.

The second neural network model 920 may be stored in the memory 120 of the electronic apparatus 100, or may be stored in the external server.

The processor 160 may move to the second area where the probability that the user may be located currently is the highest based on an output value of the second neural network model 920.

FIG. 10 is a diagram for illustrating probability values that a user may be located for each area obtained by an electronic apparatus based on context information and user history information according to an embodiment of the disclosure.

The processor 160 may obtain information on probabilities that a user may be located for each of a plurality of areas included in a map stored in the memory 120 or the external server based on the context information or the user history information.

Referring to FIG. 10, based on the user history information that the user usually utilizes the voice recognition function of the electronic apparatus 100 a lot in Room 1 and the context information that it is 11:00 p.m. on Sunday, the processor 160 may obtain the probability that the user may be located in Room 1 (540-1) to be highest as 75%, and obtain the probabilities that the user may be located in the living room 520 and Room 2 (540-2) to be relatively lower as 10%.

The processor 160 may obtain the probabilities that the user may be located for each of the plurality of areas as above as output values by inputting the context information and the user history information 910 into the second neural network model 920.

However, embodiments of the disclosure are not limited thereto, and the processor 160 may obtain the probabilities by using at least one of a weight according to a context, a weight according to a voice recognition history, a weight according to spatial information stored in a map, or a weight according to information received from an external apparatus.

Specifically, if the current time is between 1 a.m. and 6 a.m., higher weights may be granted to the rooms 540-1, 540-2, 540-3 than the living room 520 or the kitchen 530, and if the current time is between 6 p.m. and 7 p.m., a higher weight may be granted to the kitchen 530.

Also, a higher weight may be granted to an area where there are more histories that the user utilized the voice recognition function of the electronic apparatus 100.

In addition, a higher weight may be granted to an area where there are more numbers of obstacles or external apparatuses.

The processor 160 may store a value of summing up all of the weights of each area as the score of each area, and may thereby obtain information on the score sizes for each area. The processor 160 may identify that a space wherein the size of the score of each area is bigger has a higher probability that the user may be located.

Figure 11:
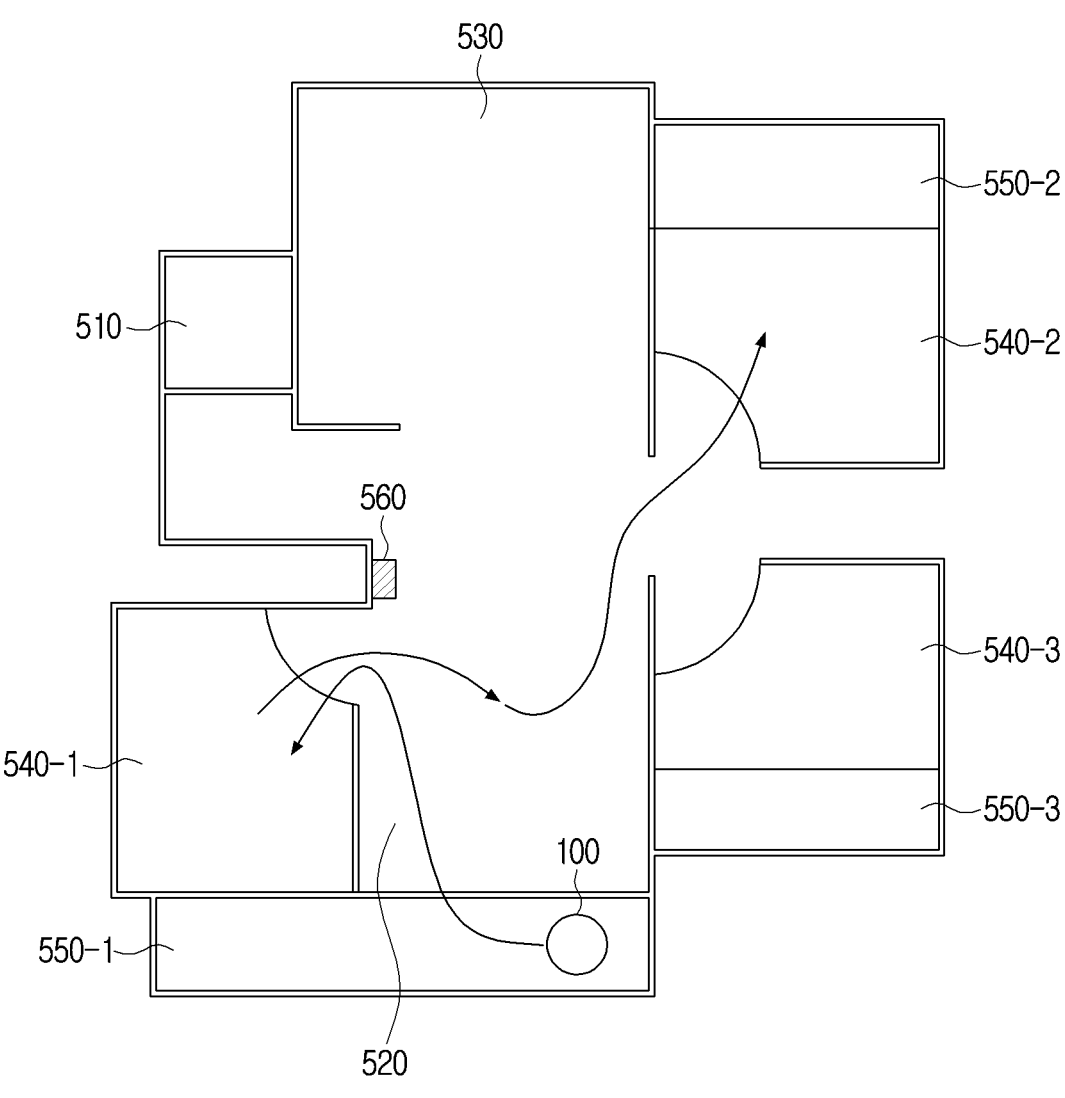
FIG. 11 is a diagram for illustrating a moving path where an electronic apparatus sequentially moves from an area where the probability that a user may be located is high to an area where the probability is low according to an embodiment of the disclosure.

FIG. 11 is a diagram for illustrating a moving path where an electronic apparatus sequentially moves from an area where the probability that a user may be located is high to an area where the probability is low according to an embodiment of the disclosure.

According to an embodiment of the disclosure, the processor 160 may obtain information on probabilities that the user may be located for each of the plurality of areas included in the map stored in the memory 120 or the external server or information on the sizes of scores according to weights, and generate a moving path where the electronic apparatus sequentially moves from an area where the obtained probability or score is high to an area where the obtained probability or score is low, and control the driver 130 to move to the second area where the user is located based on the generated moving path.

Referring to FIG. 11, the processor 160 may obtain information relating to an emergency context in the balcony 550-1 which is the first area, and then obtain information on scores based on the probabilities that the user may be located for each area or the weights based on the context information and the user history information. The processor 160 may generate a moving path where the electronic apparatus 100 sequentially moves first to Room 1 (540-1) wherein the obtained probability or score is the highest, and then move to the living room 520 wherein the obtained probability or score is the second highest, and then move to Room 2 (540-2) wherein the obtained probability or score is the third highest.

Here, in case the difference among the probabilities or the scores that the user may be located that were obtained for each area is not big, the processor 160 may control the driver 130 to move to a closer area to the current location of the electronic apparatus 100 first.

For example, referring to FIG. 11, in case there is not a big difference in the sizes of the probabilities or the scores between Room 1 (540-1) wherein the probability or the score that the user may be located was obtained to be the loudest and the living room 520 wherein the probability or the score that the user may be located was obtained to be the second loudest, the processor 160 may control the driver 130 to move first to the living room 520 which is in a closer distance from the electronic apparatus 100 located in the balcony 550-1.

Figure 12:
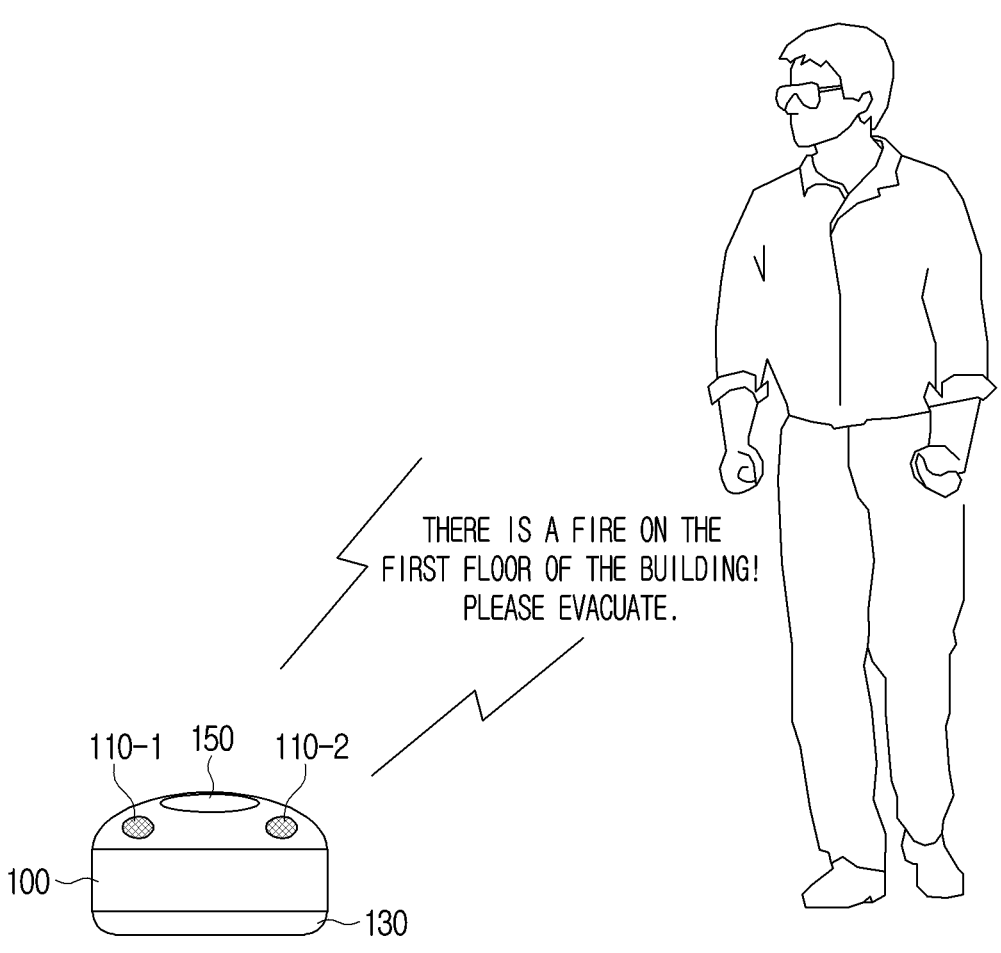
FIG. 12 is a diagram for illustrating an operation of an electronic apparatus of providing information relating to an emergency context to a user according to one or more embodiments of the disclosure.

FIG. 12 is a diagram for illustrating an operation of an electronic apparatus of providing information relating to an emergency context to a user according to one or more embodiments of the disclosure.

The processor 160 may move to the second area, and then provide information relating to an emergency context to the user.

Here, the processor 160 may output the information relating to the emergency context in an auditory form, a visual form, an olfactory form, a tactile form, etc. through the output 150.

Specifically, the processor 160 may provide a warning message to the user by outputting a voice which is "There is a fire on the first floor of the building! Please evacuate!" or outputting a siren sound, an alarm sound, etc. through the speaker 150-1.

Also, the processor 160 may output information relating to the emergency context in a visual form through the display 150-2. For example, the processor 160 may display a warning message through the display 150-2. The processor 160 may identify the degree of danger of the emergency context through the display 150-2 and display a warning message in colors such as red, orange, yellow, green, blue, etc., or display a user manual relating to the emergency context, or display an evacuation route.

The processor 160 may generate a vibration through the vibration generator 150-3, and provide a notification regarding occurrence of an emergency context to the user.

According to the one or more embodiments of the disclosure, the processor 160 may output a vibration by varying the vibration strength through the vibration generator 150-3 according to the degree of danger of an emergency context. Specifically, if an emergency context is identified as an emergency context of a higher degree of danger, the processor 160 may output a strong vibration, and if an emergency context is identified as an emergency context of a relatively lower degree of danger, the processor 160 may output a weak vibration.

Figure 13:
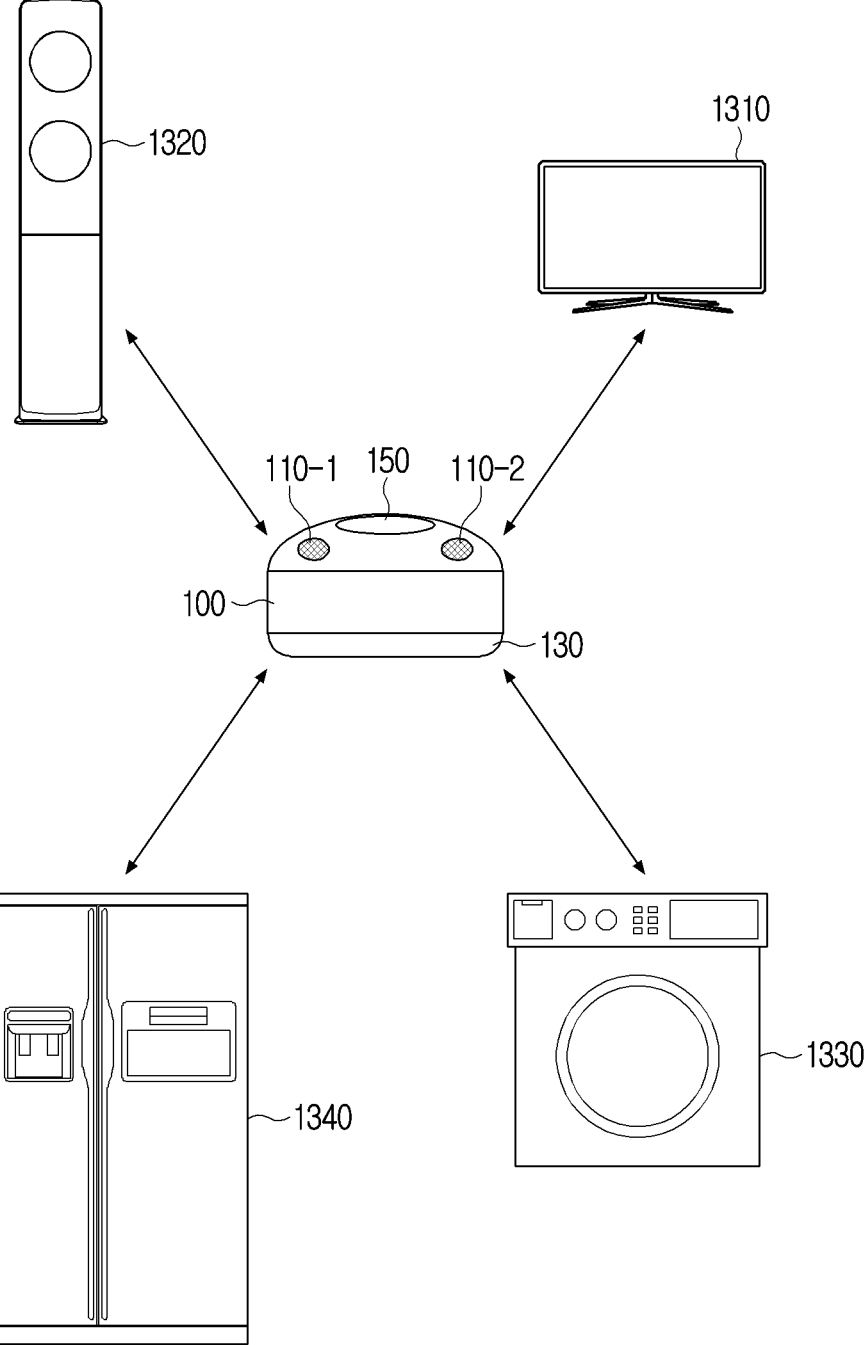
FIG. 13 is a diagram for illustrating an operation of an electronic apparatus of interacting with an external apparatus according to one or more embodiments of the disclosure.

FIG. 13 is a diagram for illustrating an operation of an electronic apparatus of interacting with an external apparatus according to one or more embodiments of the disclosure.

The processor 160 of the electronic apparatus 100 may perform communicative connection with external electronic apparatuses 1310, 1320, 1330, 1340, and identify whether the external apparatuses 1310, 1320, 1330, 1340 are operating, and if it is identified that an emergency context has occurred, the processor 160 may transmit signals requesting stopping of the operations to the external apparatuses 1310, 1320, 1330, 1340.

FIG. 14 is a flow chart for illustrating an operation of an electronic apparatus according to one or more embodiments of the disclosure.

The electronic apparatus 100 may identify whether an emergency context has occurred by obtaining a sound in the periphery of the electronic apparatus 100 in operation S1410. The electronic apparatus 100 may identify whether an emergency context has occurred by detecting a person's screaming sound, a starting sound of indoor broadcasting, a siren sound, a sound asking for help, and a sound of explosion.

If it is identified that an emergency context has occurred, the electronic apparatus 100 may obtain information relating to a location where a sound relating to the emergency context is generated based on information relating to the obtained sound in operation S1420. The information relating to the location where the sound relating to the emergency context is generated may be output by being distinguished as indoors and outdoors. Here, the electronic apparatus 100 may input the obtained sound into a first neural network model and obtain information on the probability that the sound relating to the emergency context may be generated indoors and information on the probability that the sound may be generated outdoors, and determine whether the sound relating to the emergency context is generated indoors or outdoors.

The electronic apparatus 100 may determine a first area corresponding to the location where the sound relating to the emergency context is generated based on the information relating to the location in operation S1430. The electronic apparatus 100 may control the driver to move to the determined first area in operation S1440. Specifically, if it is identified that the sound relating to the emergency context was generated indoors, the electronic apparatus 100 may move to the first area where the sound relating to the emergency context was generated among a plurality of areas included in a pre-stored map. If it is identified that the sound relating to the emergency context was generated outdoors, the electronic apparatus 100 may move to the first area located in a direction where the volume of the sound relating to the emergency context is detected to be the loudest in the stored map. Here, the electronic apparatus 100 may move to the first area located in a direction where the sound relating to the emergency context is detected to be the clearest compared to the ambient noises. The electronic apparatus 100 may move to a location for obtaining information relating to the emergency context in the first area based on the spatial characteristic of the first area and the ambient sounds.

The electronic apparatus 100 may obtain the information relating to the emergency context in the first area in operation S1450. In the information relating to the emergency context, information regarding whether a fire occurred, whether an earthquake occurred, and whether a thief broke in may be included.

The electronic apparatus 100 may determine a second area corresponding to the user location based on context information and user history information in operation S1460. The electronic apparatus 100 may control the driver to move to the determined second area in operation S1470. The context information may include information regarding the current date, the current time, and the current season, and the user history information may include the user's voice recognition history, information on each area in a pre-stored map, etc., but embodiments of the disclosure are not limited thereto, and operation information of another external apparatus, etc. may be included.

The electronic apparatus 100 may provide the information relating to the emergency context to the user in the second area in operation S1480. The information provided to the user may include visual information, auditory information, olfactory information, and tactile information.

Figure 15:
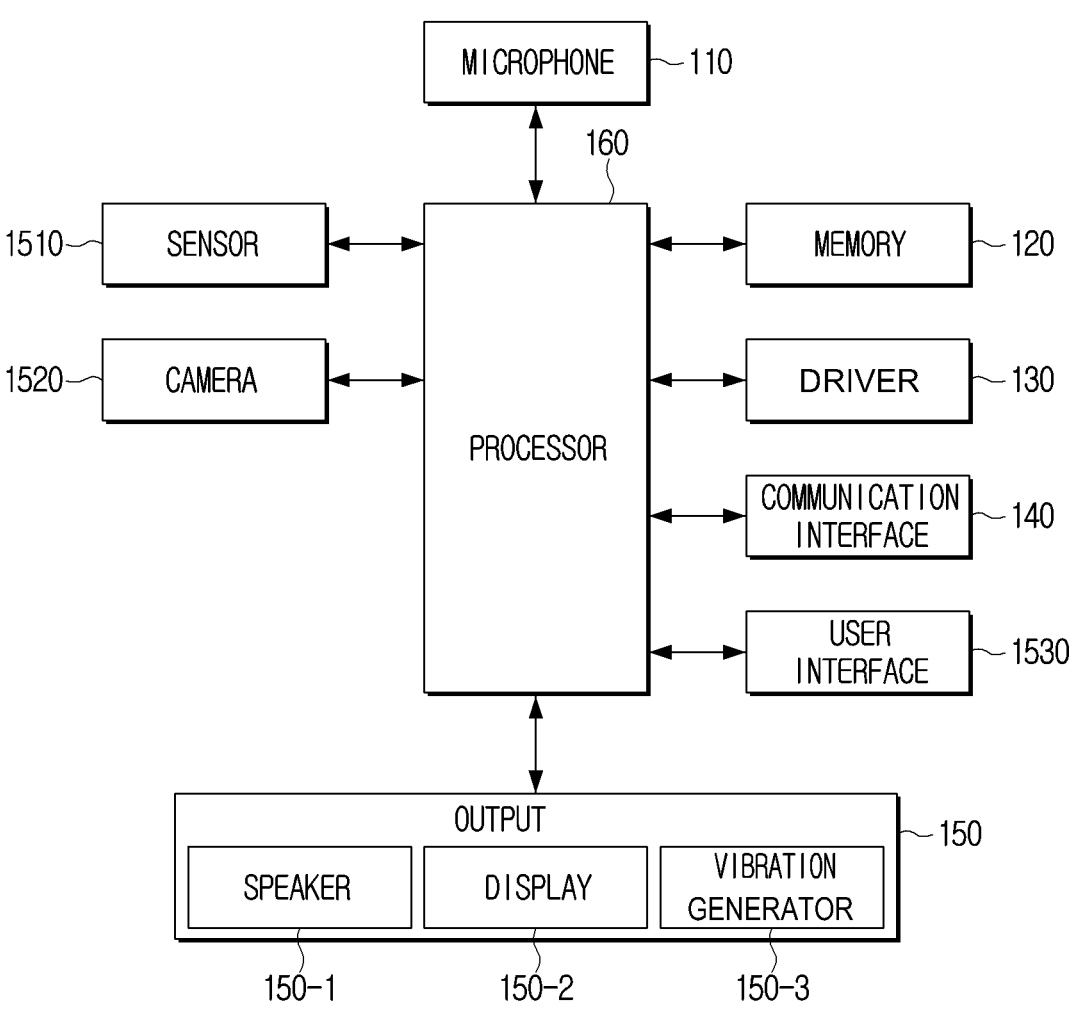
FIG. 15 is a block diagram illustrating a configuration of an electronic apparatus according to one or more embodiments of the disclosure.

FIG. 15 is a block diagram illustrating a configuration of an electronic apparatus according to another embodiment of the disclosure.

As the configurations of the microphone 110, the memory 120, the driver 130, the communication interface 140, the output 150, and the processor 160 of the electronic apparatus 100 were described above together with FIG. 1, additional explanation will be omitted.

Referring to FIG. 15, the electronic apparatus 1500 according to another embodiment of the disclosure may further include a sensor 1510 for detecting sounds, vibrations, lights, temperatures, etc., a camera 1520 for obtaining images, and a user interface 1530 for receiving input of a user's instruction or providing information to a user.

The sensor 1510 may detect an operation state (e.g., the power or the temperature) of the electronic apparatus 100, or an external environmental state (e.g., a user state), and generate an electric signal or a data value corresponding to the detected state. According to an embodiment, the sensor 1510 may include a gesture sensor, a gyro sensor, a barometric sensor, a magnetic sensor, an acceleration sensor, a grip sensor, a proximity sensor, a color sensor, an infrared (IR) sensor, a bio sensor, a temperature sensor, a humidity sensor, or an illumination sensor.

The sensor 1510 may obtain various kinds of information relating to the electronic apparatus 100. In particular, the sensor 1510 may include a global positioning system (GPS) that can obtain location information of the electronic apparatus 100, and may include various sensors such as a bio sensor (e.g., a heart rate sensor, a PPG sensor, etc.) for obtaining bio data of a user who uses the electronic apparatus 100, a movement sensor for detecting movements of the electronic apparatus 100, etc.

The processor 160 may obtain temperature information through the temperature sensor and identify that a fire took place indoors, and detect a vibration through the vibration sensor and identify that an earthquake took place, and identify that a blackout took place through the illumination sensor.

Also, the processor 160 may identify the distance from an ambient obstacle and the direction of the ambient obstacle through the IR sensor and the proximity sensor. The processor 160 may identify an ambient obstacle through the sensor, and control the driver 130 such that the electronic apparatus 100 moves to a location where there is no obstacle.

The camera 1520 may include at least one lens, a flash, an image sensor, and an image signal processor.

The processor 160 may obtain images regarding an ambient space, an ambient area, geographic features, an obstacle, etc. through the camera 1520, and control the driver 130 to move to a location that the electronic apparatus 100 is to move based on obtained images, or control the driver 130 to move while avoiding the obstacle.

Also, the processor 160 may obtain information relating to an emergency context that occurred indoors such as a fire, an explosion, etc. based on images obtained through the camera 1520.

The user interface 1530 may include a button-type interface, a lever-type interface, a switch-type interface, and a touch-type interface, etc., and the touch-type interface may be implemented in a type of receiving an input through a user's touch on the display 150-2. However, embodiments of the disclosure are not limited thereto, and the user interface 1530 may include components in various types that can receive an input of a user instruction.

The processor 160 may receive an input of a user instruction through the user interface 1530. Specifically, the processor 160 may receive an input of an instruction for transmitting a signal for another external apparatus through the user interface, receive an input of an instruction regarding a call for reporting an emergency context, receive an input of an instruction regarding display of map information, and receive an input of an instruction regarding display of a user manual in an emergency context.

According to an embodiment of the disclosure, the aforementioned one or more embodiments may be implemented as software including instructions stored in machine-readable storage media, which can be read by machines (e.g., computers). The machines refer to apparatuses that call instructions stored in a storage medium, and can operate according to the called instructions, and the apparatuses may include an apparatus according to the embodiments disclosed herein. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium is a tangle apparatus, and does not include signals (e.g., electromagnetic waves), but does not indicate whether data is stored in the storage medium semi-permanently or temporarily. For example, 'a non-transitory storage medium' may include a buffer wherein data is temporarily stored.

Also, according to an embodiment, methods according to the one or more embodiments disclosed herein may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed directly online (e.g., download or upload) through an application store (e.g., Play Store™), or between two user apparatuses (e.g., smartphones). In the case of on-line distribution, at least a portion of a computer program product (e.g., a downloadable app) may be stored in a storage medium readable by machines such as the server of the manufacturer, the server of the application store, and the memory of the relay server at least temporarily, or may be generated temporarily.

In addition, while preferred embodiments of the disclosure have been shown and described, embodiments of the disclosure are not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:
a microphone;
a driver;
an output; and
at least one processor,
wherein the at least one processor is configured to:
    identify whether an emergency context has occurred based on a sound in a periphery of the electronic apparatus,
    based on identifying that the emergency context has occurred, obtain information relating to a location where a sound relating to the emergency context has been generated based on information relating to the obtained sound,
    based on the information relating to the location, determine a first area corresponding to the location where the sound relating to the emergency context has been generated,
    control the driver to move to the determined first area,
    obtain information relating to the emergency context from the first area,
    based on context information and user history information, determine a second area corresponding to a location of a user,
    control the driver to move to from the determined first area to the determined second area, and
    provide the information relating to the emergency context to the user in the second area.

2. The electronic apparatus of claim 1, wherein the at least one processor is further configured to obtain information relating to the location where the sound relating to the emergency context has been generated by inputting the information relating to the obtained sound into a first neural network model, and
    wherein the information relating to the location where the sound relating to the emergency context has been generated comprises information relating to whether the sound relating to the emergency context has been generated indoors or outdoors.

3. The electronic apparatus of claim 1, wherein the at least one processor is further configured to:
    based on identifying that the sound relating to the emergency context has been generated indoors, move to the first area where the sound relating to the emergency context has been generated among a plurality of areas included in a pre-stored map, and
    control the driver to move to a location for obtaining the information relating to the emergency context in the first area based on a spatial characteristic and ambient sounds of the first area.

4. The electronic apparatus of claim 1, wherein the at least one processor is further configured to:
    based on identifying that the sound relating to the emergency context has been generated outdoors, move to the first area located in a direction where a volume of the sound relating to the emergency context has been detected to be the loudest in a stored map, and
    based on a spatial characteristic and ambient sounds of the first area, control the driver to move to a location for obtaining the information relating to the emergency context in the first area.

5. The electronic apparatus of claim 4, wherein the at least one processor is further configured to control the direction of the microphone correspondingly to the direction where the volume of the sound relating to the emergency context has been detected to be the loudest.

6. The electronic apparatus of claim 1, wherein the at least one processor is further configured to:
    obtain information relating to an area where the user is located by inputting the context information into a trained second neural network model, and
    control the driver to move to the area where the user is located.

7. The electronic apparatus of claim 6, wherein the information relating to the area where the user is located comprises information on probabilities that the user is located for each of a plurality of areas, and
    wherein the at least one processor is further configured to:
        generate a moving path where the electronic apparatus sequentially moves from an area where the obtained probability that the user may be located is high to an area where the obtained probability is low, and
        control the driver to move to the second area based on the moving path.

8. The electronic apparatus of claim 1, wherein the at least one processor is further configured to:
    obtain information relating to the location of the user by using at least one of a first weight according to a context, a second weight according to a voice recognition history, a third weight according to spatial information stored in a map, or a fourth weight according to information received from an external apparatus, and
    control the driver to move to the location of the user.

9. The electronic apparatus of claim 1, wherein the at least one processor is further configured to, based on whether a predetermined noise is included in the obtained sound, identify whether the emergency context occurred, and
    wherein the predetermined noise comprises at least one of a screaming sound, a siren sound, a starting sound of indoor broadcasting, or a sound asking for help.

10. The electronic apparatus of claim 1, wherein the electronic apparatus comprises a communication interface, and
    wherein the at least one processor is further configured to, based on identifying that the emergency context occurred, transmit a signal requesting stopping of an operation to an external apparatus.

11. A method for controlling an electronic apparatus, the method comprising:
    identifying whether an emergency context has occurred based on a sound in a periphery of the electronic apparatus;
    based on identifying that the emergency context has occurred, obtaining information relating to a location where a sound relating to the emergency context has been generated based on information relating to the obtained sound;
    based on the information relating to the location, determining a first area corresponding to the location where the sound relating to the emergency context has been generated;
    controlling a driver to move to the determined first area;

obtaining information relating to the emergency context from the first area;

based on context information and user history information, determining a second area corresponding to a location of a user, controlling the driver to move from the determined first area to the determined second area; and providing the information relating to the emergency context to the user in the second area.

12. The method of claim 11, wherein the obtaining the information relating to the location where the sound relating to the emergency context has been generated comprises obtaining information relating to the location where the sound relating to the emergency context has been generated by inputting the information relating to the obtained sound into a first neural network model, and wherein the information relating to the location where the sound relating to the emergency context has been generated comprises information relating to whether the sound relating to the emergency context has been generated indoors or outdoors.

13. The method of claim 11, wherein the moving to the first area comprises:

based on identifying that the sound relating to the emergency context has been generated indoors, moving to the first area where the sound relating to the emergency context has been generated among a plurality of areas included in a pre-stored map; and moving to a location for obtaining the information relating to the emergency context in the first area based on a spatial characteristic and ambient sounds of the first area.

14. The method of claim 11, wherein the moving to the first area comprises:

based on identifying that the sound relating to the emergency context has been generated outdoors, moving to the first area located in a direction where a volume of the sound relating to the emergency context has been detected to be the loudest in a stored map; and moving to a location for obtaining the information relating to the emergency context in the first area based on a spatial characteristic and ambient sounds of the first area.

15. The method of claim 14, wherein the obtaining the information relating to the emergency context comprises controlling the direction of a microphone correspondingly to the direction where the volume of the sound relating to the emergency context has been detected to be the loudest.

* * * * *